US012559211B2

(12) United States Patent
Ma et al.

(10) Patent No.: US 12,559,211 B2
(45) Date of Patent: Feb. 24, 2026

(54) COVERAGE-PATH PLANNING METHOD FOR SINGLE UNMANNED SURFACE MAPPING VESSEL

(71) Applicant: WUHAN UNIVERSITY OF TECHNOLOGY, Wuhan (CN)

(72) Inventors: Yong Ma, Wuhan (CN); Jing Wang, Wuhan (CN); Huaxiong Bi, Wuhan (CN); Xinping Yan, Wuhan (CN); Yuanzhou Zheng, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 116 days.

(21) Appl. No.: 18/399,761

(22) Filed: Dec. 29, 2023

(65) Prior Publication Data

US 2024/0217630 A1     Jul. 4, 2024

Related U.S. Application Data

(63) Continuation-in-part of application No. 18/069,986, filed on Dec. 21, 2022, now abandoned.

(51) Int. Cl.
B63B 79/40          (2020.01)
B63B 35/00          (2020.01)
(Continued)

(52) U.S. Cl.
CPC .............. B63B 79/40 (2020.01); B63B 35/00 (2013.01); G01C 21/203 (2013.01); G05D 1/246 (2024.01);
(Continued)

(58) Field of Classification Search
CPC ... B63B 79/40; B63B 35/00; B63B 2035/007; B63B 2211/02; G01C 21/203;
(Continued)

(56) References Cited

U.S. PATENT DOCUMENTS 6,629,037 B1 *   9/2003   Nyland ................ G01V 1/3808
                                                    702/14
9,026,302 B2     5/2015   Stout et al.
(Continued)

FOREIGN PATENT DOCUMENTS

CN        107727098 A      2/2018
CN        108445894 A      8/2018
(Continued)

*Primary Examiner* — Aaron L Troost

(74) *Attorney, Agent, or Firm* — Troutman Pepper Locke LLP; Tim Tingkang Xia, Esq.

(57)          ABSTRACT

An optimized coverage-path planning method for a single unmanned surface mapping vessel (USMV) is implemented with a system including a computer processor executing a computer program loaded in a storage device and implanting the method. The method includes rasterizing and initializing an environmental map, and an unmanned vessel outputting position data and obstacle data according to the environmental map so that path planning is started to provide a target point to the unmanned vessel. In case of tripping in a local optimum at a current-level map for the target point, the map level is updated in an ascending order until the highest level, in order to identify a map level in which the target point is found.

8 Claims, 3 Drawing Sheets

(51) Int. Cl.

| | |
|---|---|
| *G01C 21/20* | (2006.01) |
| *G05D 1/246* | (2024.01) |
| *G05D 105/80* | (2024.01) |
| *G05D 107/00* | (2024.01) |
| *G05D 109/30* | (2024.01) |

(52) U.S. Cl.
   CPC ..... *B63B 2035/007* (2013.01); *B63B 2211/02* (2013.01); *G05D 2105/87* (2024.01); *G05D 2107/27* (2024.01); *G05D 2109/30* (2024.01)

(58) Field of Classification Search
   CPC ...... G05D 1/246; G05D 1/2464; G05D 1/648; G05D 2105/87; G05D 2107/27; G05D 2109/30; G05D 2109/34
   See application file for complete search history.

(56) References Cited

U.S. PATENT DOCUMENTS

| | | | |
|---|---|---|---|
| 10,207,408 B1 | | 2/2019 | Ebrahimi Afrouzi et al. |
| 10,613,541 B1 * | | 4/2020 | Ebrahimi Afrouzi ........................ G05D 1/0221 |

FOREIGN PATENT DOCUMENTS

| | | | |
|---|---|---|---|
| CN | 109540136 | A | 3/2019 |
| CN | 110196059 | A | 9/2019 |
| CN | 110398250 | A | 11/2019 |
| CN | 111060109 | A | 4/2020 |
| CN | 111457927 | A | 7/2020 |
| CN | 111562785 | A | 8/2020 |
| CN | 111580517 | A | 8/2020 |
| CN | 112113573 | A | 12/2020 |

* cited by examiner rasterizing an environmental map to create a plurality of grids, dividing the environmental map into a plurality of levels ($BL_0$, $BL_1$,..., $BL_L$) with several grids of a lower level forming one grid in a next higher level, initializing the environmental map by assigning a status value ($GT$) to each of the plurality of grids as $ue$, assigning a grid value ($BV_{a0}$) to a grid $a_0$ in a $BL_0$-level map, then importing the initialized environmental map, inputting coordinates and updating the environmental map, wherein the $ue$ represents a free space where a bathymetry mission is not completed, L is a number of the levels of the environmental map, $BL_0$ is a lowest level and $BL_L$ is a highest level;

S101 outputting, by an Unmanned Surface Mapping Vessel (USMV), position information $\omega$ and obstacle information $\eta$ thereof according to the updated environmental map to further update the environmental map, outputting a grid status list ($GT\_list$) of the plurality of grids according to the further updated environmental map, and receiving the grid value of each of the plurality of grids in the $BL_0$-level map and the position information $\omega$ and obstacle information $\eta$ output from the USMV according to the grid status list, starting path planning, and outputting a target point $tp$ to the USMV, wherein the $tp$ represents an index value of the grid where a next target point of the USMV is located

S102 performing an operation of updating each map level in an ascending order in case of being in a local optimum at the $BL_0$-level map, and searching the corresponding level for the $tp$ to acquire a $tp$ list, calculating a final $tp$ according to a cost value, transmitting the final $tp$ to the USMV, and switch the USMV to execute a $tr$ instruction, and when the $tr$ instruction is executed, entering the $BL_0$-level map and continuing to perform the path planning, wherein the $tr$ instruction represents the USMV is in a Travel state which is a non-task state after the USMV reaches the local optimum;

S103 ending the operation of updating in case of finding no target point $tp$ at the map corresponding to a highest level ($BL_L$), checking a status of the highest level map, and outputting an $E$ state, wherein the $E$ state represents an end state

COVERAGE-PATH PLANNING METHOD FOR SINGLE UNMANNED SURFACE MAPPING VESSEL

CROSS-REFERENCE TO RELATED APPLICATIONS

This application is a continuation-in-part of application Ser. No. 18/069,986, filed in Dec. 21, 2022, which is a continuation of International Patent Application No. PCT/CN2021/117160 with a filing date of Sep. 8, 2021, designating the United States, and further claims priority to Chinese Patent Application No. 202010987645.4 with a filing date of Sep. 8, 2020. The content of the aforementioned applications, including any intervening amendments thereto, are incorporated herein by reference.

TECHNICAL FIELD

The present disclosure belongs to the field of path planning, and more particularly, relates to a coverage-path planning method (IBA*) for a single unmanned surface mapping vessel.

BACKGROUND

Marine surveying is the basic work for building marine informationization, which has important economic significance for the development of national marine resources. Surveyors are faced with the problems of high labor intensity and high safety risks. All kinds of dangerous scenes make it difficult to implement traditional measurement methods.

The Unmanned Surface Vessel (USV) is a kind of marine intelligent platform which can navigate autonomously and safely in various marine environments and perform various tasks. The Unmanned Surface Mapping Vessel (USMV) used in ocean surveying can improve the efficiency of surveying and mapping operations, reduce the cost of mapping underwater topography and operational safety risks, and is very suitable for replacing or assisting traditional ocean surveying, thus having broad application prospects. At present, a single USMV is vulnerable to the limitations of endurance and operation efficiency in measuring coverage operation, while multi-USMV collaborative scanning can improve the efficiency of area coverage operation and shorten the time to complete tasks, so it has better task execution ability. As the basis and premise of collaborative surveying on water, it is of great significance to carry out research on multi-USV coverage path planning.

At present, the research on coverage path planning mostly focuses on the field of ground mobile robots. Compared with the ground mobile robot, the working range of the USMV is wider and the water environment is more complex, which requires higher efficiency and robustness of the coverage path planning algorithm.

SUMMARY

Aiming at the above deficiencies in the prior art, the present disclosure proposes a coverage-path planning method for a single unmanned surface mapping vessel to improve the coverage rate and coverage effect in a complex operating environment of the unmanned surface mapping vessel and improve the operational efficiency of the unmanned surface mapping vessel.

In one aspect, the present disclosure provides a coverage-path planning method for a single unmanned surface mapping vessel, which is executable in a system that comprises a computer processor and a storage device in communication connection with the computer processor and loaded with a computer program executed in the processor to implement the coverage-path planning method, the coverage-path planning method comprising the following steps:

(1) rasterizing an environmental map to create a plurality of grids, dividing the environmental map into a plurality of levels ($BL_0$, $BL_1$, . . . , $BL_L$) with several grids of a lower level forming one grid in a next higher level, initializing the environmental map by assigning a status value (GT) to each of the plurality of grids as ue, assigning a grid value ($BV_{a0}$) to a grid $a_0$ in a $BL_0$-level map, then importing the initialized environmental map, inputting coordinates and updating the environmental map, wherein the ue represents a free space where a bathymetry mission is not completed, L is a number of the levels of the environmental map, $BL_0$ is a lowest level and $BL_L$ is a highest level;

(2) outputting, by an Unmanned Surface Mapping Vessel (USMV), position information $\omega$ and obstacle information $\eta$ thereof according to the updated environmental map to further update the environmental map, outputting a grid status list (GT_list) of the plurality of grids according to the further updated environmental map, and receiving the grid value of each of the plurality of grids in the $BL_0$-level map and the position information $\omega$ and obstacle information $\eta$ output from the USMV according to the grid status list, starting path planning, and outputting a target point tp to the USMV, wherein the tp represents an index value of the grid where a next target point of the USMV is located;

(3) performing an operation of updating each map level in an ascending order in case of being in a local optimum at the $BL_0$-level map, and searching the corresponding level for the tp to acquire a tp list, calculating a final tp according to a cost value, transmitting the final tp to the USMV, and switch the USMV to execute a tr instruction, and when the tr instruction is executed, entering the $BL_0$-level map and continuing to perform the path planning, wherein the tr instruction represents the USMV is in a Travel state which is a non-task state after the USMV reaches the local optimum;

(4) ending the operation of updating in case of finding no target point tp at the map corresponding to a highest level ($BL_L$), checking a status of the highest level map, and outputting an E state, wherein the E state represents an end state.

In some alternative embodiments, the status value ($GT_{a0}$) of the grid $a_0$ in the $BL_0$-level map is defined as:

$$GT_{a_0} = obs, \exp, ue, \text{ or } fz$$

wherein obs represents an obstacle, exp represents the free space where the bathymetry mission has been completed, and fz represents a forbidden zone; the grid value ($BV_{a0}$) of the grid $a_0$ in the $BL_0$-level map is defined as:

$$BV_{a_0} = \begin{cases} -1, & \text{if } GT_{a_0} = obs \text{ or } fz \\ 0, & \text{if } GT_{a_0} = \exp \\ \varepsilon_{a_0}, & \text{if } GT_{a_0} = ue \end{cases}$$

wherein $\varepsilon_{\alpha_0}$ is a potential energy of the grid $a_0$ defined as:

$$\varepsilon_{\alpha_0}(x_o, y_0) = k \cdot N_x - x_0, k > 1 \qquad 5$$

wherein $x_o$ and $y_0$ are a horizontal coordinate value and a vertical coordinate value of the grid $a_0$ in the $BL_0$-level map respectively; k is a potential energy coefficient, and $N_x$ is a maximum horizontal coordinate value in the $BL_0$-level map; and the grid value is assigned to each of the plurality of grids in the $BL_0$-level map line-by-line.

In some alternative embodiments, the step (2) includes:

recording a detection area of the USMV in the updated environmental map as $D^0(\omega)$, $\omega \in D^0(\omega)$, wherein the $D^0(\omega)$ contains all the grids perceptible to the USMV at the current position;

defining a priority area $F^0$, wherein $F^0$ comprises a set of grids with a connection line between each of the set of grids and the w does not pass through a grid in a fz or obs state and a potential energy value of each of the set of grids being positive, $F^0 \subseteq D^0(\omega)$;

for coverage-path planning in the $BL_0$-level map, since a priority path of the USMV is to complete a coverage task in a direction of a single scanning line, selecting the grid on a same scanning line in the $D^0(\omega)$ as the target point; specifically, defining the grids in the $D^0(\omega)$ in both north and south directions as $\omega^N$ and $\omega^s$;

when $BV_\omega > 0$ and $\{\omega^N, \omega^S\} \subset F^0$, in order to circumvent the case of massive backtracking, selecting the grid adjacent to the obstacle from the two grids, denoting the grid as $tp_{obs}$;

in the case where both the $\omega^N$ and $\omega^s$ are adjacent to the obstacle, introducing both into a cost calculation formula to calculate the potential cost values J(tp) produced by both paths, and selecting a relatively optimum path from local and global points of view;

in the case where only one of the $\omega^N$ and $\omega^s$ is adjacent to the obstacle, then then giving priority to a $\omega^N$ or $\omega^s$ orientation where the adjacent obstacle is located to start traversal, wherein in the case of $BV_\omega > 0$, the status value of the $\omega$ grid where the USMV is located is ue, in two grids above and below the $\omega$ grid, the status value of one side is exp or obs and the status value of the other one is ue, the $\omega$ grid is the target point, and the USMV switches to execute a tc instruction which guides the USMV to start an actual bathymetry mission;

when $BV_\omega = F^0 \neq \varnothing$, determining that the USMV has completed the task on the single scanning line, starting to turn to a next stage of traversal, taking the grid with a largest grid value as the target point tp, starting a next action;

when none of the above cases are met, determining that the USMV is in the local optimum, wherein the USMV is driving into a concave obstacle area or is surrounded by an area with $BV \leq 0$ when being in the local optimum, and switching to a high-level map for the path planning, and switching the USMV to execute the tr instruction.

In some alternative embodiments, the priority area is determined by:

$$F^0 = \{\alpha_0 \in D^0(\omega): BV_{\alpha_0} > 0\}. \qquad 65$$

In some alternative embodiments, the potential cost value is determined by:

$$J(tp) = k_\theta \cdot \theta(\omega, tp) + k_d \cdot d(\omega, tp) + k_{ul} \cdot N_{exp},$$

wherein, $$d(\omega, tp) = \left\| (\omega_x, \omega_y) - (tp_x, tp_y) \right\|_2,$$

$k_\theta$ represents a turn cost coefficient and is considered as a unit turn angle cost; $\theta$ represents an absolute value of an angular change; $k_d$ represents a distance cost coefficient, and is considered as a unit distance movement cost; d represents a Euclidean distance; $k_{ul}$ represents a global trend coefficient and is considered as the cost of changing the situation; $N_{exp}$ represents a number of ue-state grids in an input direction, $(\omega_x, \omega_y)$ represents horizontal and vertical coordinates of the $\omega$ grid, and $(tp_x, tp_y)$ represents horizontal and vertical coordinates of the target point tp.

In some alternative embodiments, the step (3) includes:

switching to a $BL_1$-level map with l=1, finding a grid $\alpha_l$ with a largest $BV_{F^l(\omega)}$ in $F^l$, wherein, the detection area of the USMV at the $\omega$ grid in the $BL_l$-level map and having a detection range of $R_L$ is defined as $D^l(\omega)$, $\omega \in D^l(\omega)$; the priority area in the detection area $Dl(\omega)$ that is available for the USMV at the $\omega$ grid through an adjacent path and that is positive in the grid value is defined as $F^l$, $F^l \subseteq D^l(\omega)$ and $F^l = \{\alpha_l \in D^l(\omega): BV_{\alpha_l} > 0\}$, keeping in a calculation state to calculate potential costs of all target points in the tp list comprising no less than 2 target points; selecting an optimum target point, and making the USMV start the bathymetry mission;

since the local optimum mainly occurs at the end of the obstacle or at an end of the scanning line, calculating an adjacent path with a greedy algorithm when executing the tr instruction for continuing to track an obstacle contour until moving directly to the target point, breaking away from the local optimum and reaching the target point; in a scanning task, performing a collision avoidance action by the USMV in a scenario with obstacle existing, and switching the USMV to execute the tr instruction, returning to the $BL_0$-level map after past and clear, resuming the bathymetry mission; if it is still impossible to break away from the local optimum when l=1, switching to a higher-level map level by level until the target point is derived; and if it is still unable to break away from the local optimum when l=L, then preliminarily determining that the traversal is completed.

In some alternative embodiments, in the $BL_l$-level map, the priority area is specifically expressed as:

$$F^l = \{\alpha_l \in D^l(\omega): BV_{\alpha_l} > 0\}.$$

In another aspect, the present disclosure provides a computer readable storage medium having stored thereon a computer program which, when executed by a processor, implements the steps of the method described above.

In general, the above technical solutions can achieve the following advantageous effects compared to the prior art:

According to the disclosure, the traditional coverage-path planning algorithm is used for reference, the research on cooperative coverage-path planning of multiple USMVs is carried out in depth, and the IBA\* (Improved BA\*) algorithm is designed to plan a high-efficiency and high-quality scanning path for the USMV. Simulation results show that the performance of IBA\* algorithm is significantly improved compared with existing algorithms in path length, turning times, number of units and coverage rate. The disclosure provides a theoretical basis for the research on the coverage-path planning of the USMV, can promote the unmanned and intelligent process of marine measurement from the aspect of coverage-path planning algorithm design, reduces the cost of marine information construction, and has wide application prospects and scientific value.

BRIEF DESCRIPTION OF THE DRAWINGS

FIG. 2 is a flow diagram illustrating the coverage-path planning method for the single unmanned surface mapping vessel in accordance with an embodiment of the present disclosure;

DETAILED DESCRIPTION

In order to make the objectives, technical solutions and advantages of the disclosure more clear, the disclosure will be described in further detail below with reference to the accompanying drawings and embodiments. It should be understood that the specific embodiments described herein are intended only to explain the disclosure and are not intended to limit it. Further, the technical features related to the various embodiments of the present disclosure described below can be combined with each other as long as they do not conflict with each other.

The disclosure provides an optimized coverage-path planning method (IBA\*) for a single unmanned surface mapping vessel, which improves the coverage rate and coverage effect of the unmanned surface mapping vessel in a complex working environment and improves the working efficiency of the unmanned surface mapping vessel. In order to make the above objectives, features and advantages of the disclosure more obvious and understandable, the disclosure will be further described in detail with reference to the drawings and specific embodiments.

Figure 1:
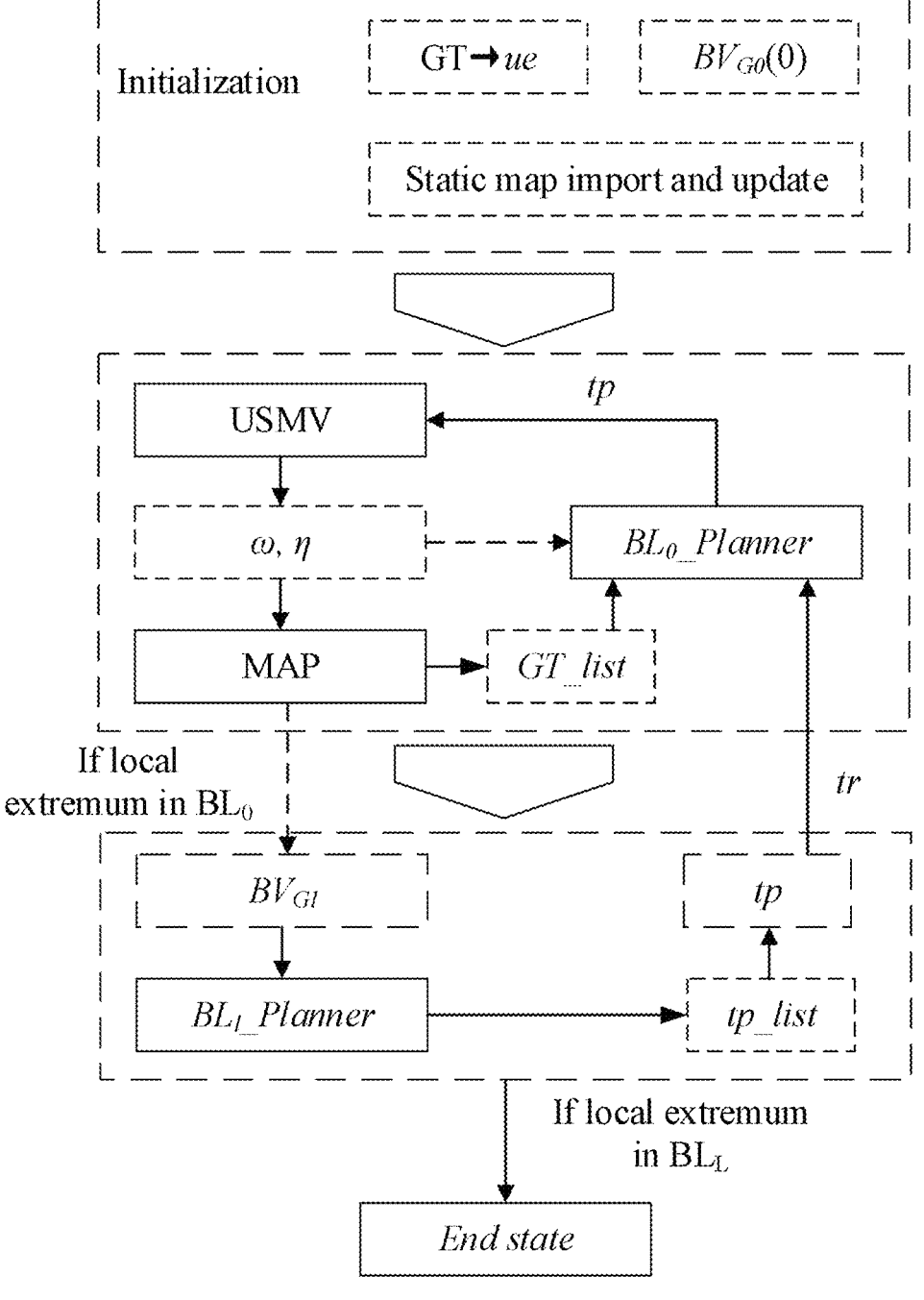
FIG. 1 is a flow block diagram illustrating a coverage-path planning method for a single unmanned surface mapping vessel in accordance with an embodiment of the present disclosure.

FIG. 1 is a flow block diagram illustrating the coverage-path planning method for the single unmanned surface mapping vessel in accordance with an embodiment of the present disclosure, and the method shown in FIG. 1 includes four steps: initialization, path planning in a $BL_0$-level map, path-planning in a $BL_l$-level map ($l{\geq}1$), and end state.

Figure 2:
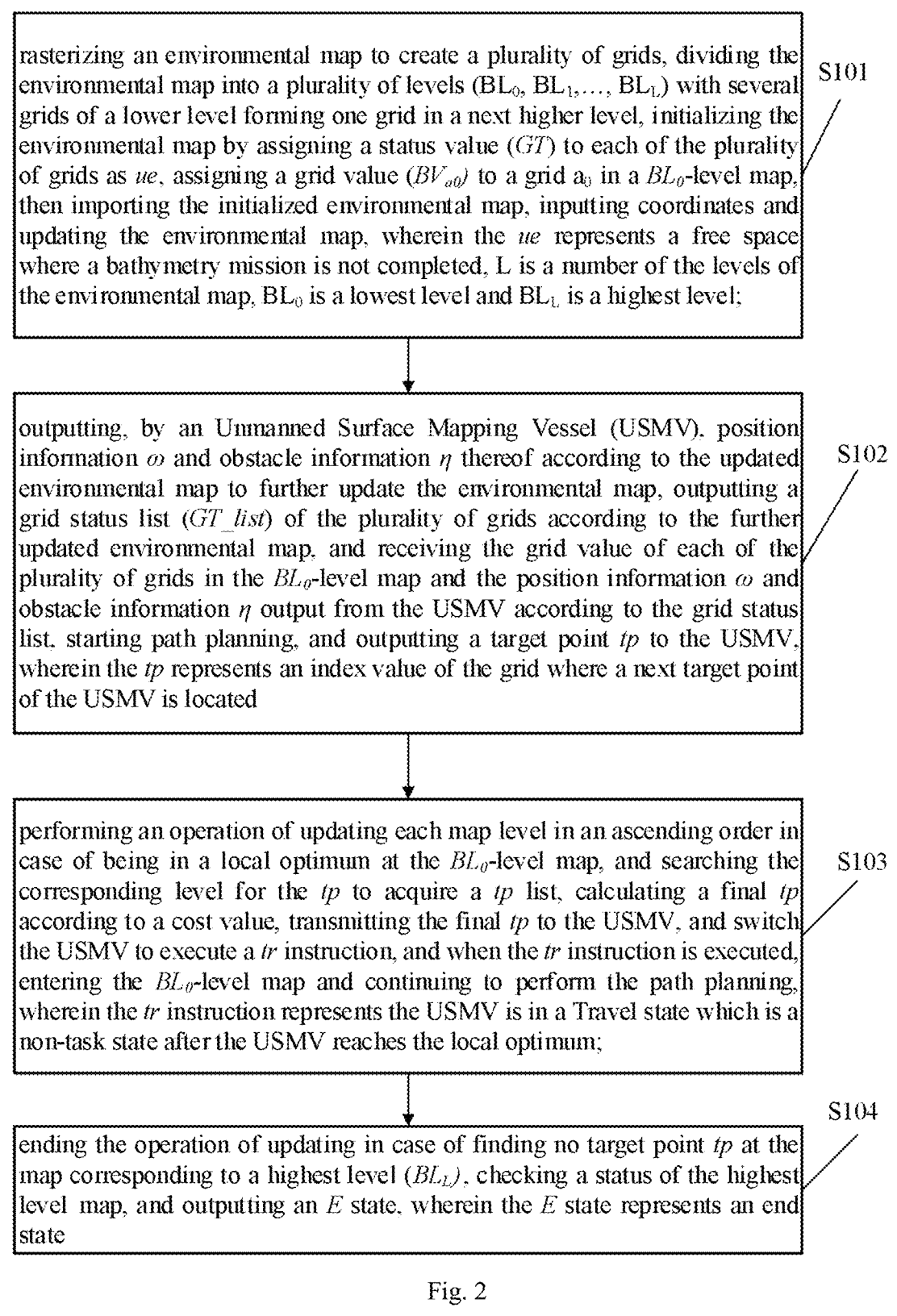

In particular, FIG. 2 is a flow diagram illustrating the coverage-path planning method for the single unmanned surface mapping vessel in accordance with an embodiment of the present disclosure, and the method includes the steps of:

In step S101, an environmental map is rasterized to create a plurality of grids, the environmental map is divided into a plurality of levels ($BL_0$, $BL_1$, . . . , $BL_L$) with several grids of a lower level forming one grid in a next higher level, the environmental map is initialized by assigning a status value (GT) to each of the plurality of grids as ue, assigning a grid value ($BV_{a0}$) to a grid $a_0$ in a $BL_0$-level map, then the initialized environmental map is imported, coordinates are inputted and the environmental map is updated.

GT represents the status value of the grid, and the ue represents a free space where a bathymetry mission is not completed. L is the number of the levels of the environmental map, $BL_0$ is the lowest level and $BL_L$ is the highest level.

During the rasterization, the environmental map in divided into several equally sized adjacent grids for easy update and maintenance. The environmental map is first quantized at a certain size, grid coordinates are established, then the coordinated grids are placed in one array, and attribute assignment is made to each grid for distinguishing different locations or grid cells.

Figure 3:
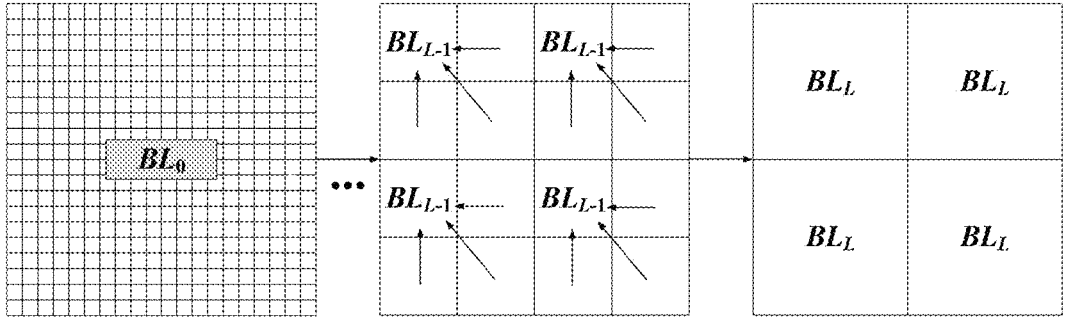
FIG. 3 shows a schematic view illustrating level division of an environmental map.

As shown in FIG. 3, the environmental map is divided into a plurality of levels. In the $BL_L$-level map, each grid can be divided into several grids, such as four grids as shown in FIG. 3, to form the $BL_{L-1}$-level map. Each grid of the $BL_L$-1-level map can further be divided into several grids to for the $BL_{L-2}$-level map. The grid of the $BL_0$-level map cannot be divided further and thus the $BL_0$-level map has the highest precision.

In step S102, the USMV outputs position information ω and obstacle information q thereof according to the updated environmental map to further update the environmental map, a grid status list GT_list of the plurality of grids is output according to the further updated environmental map, and the grid value of each of the plurality of grids in the $BL_0$-level map and position information w and obstacle information q output from the USMV is received according to the GT_list, path planning is started, and a target point tp is output to the USMV, wherein the tp represents an index value of the grid where a next target point of the USMV is located;

The grid status list is defined as GT_list, and $$GT\_list = \{obs,\ \exp,\ fz,\ ue\}$$

where obs represents an obstacle, exp represents the free space where the bathymetry mission has been completed, and fz represents a forbidden zone.

The grid value ($BV_{a0}$) of the grid $a_0$ in the $BL_0$-level map is defined as:

$$BV_{a_0} = \begin{cases} -1, & \text{if } GT_{a_0} = obs \text{ or } fz \\ 0, & \text{if } GT_{a_0} = \exp \\ \varepsilon_{a_0}, & \text{if } GT_{a_0} = ue \end{cases}$$

where $\varepsilon_{\alpha_0}$ is a potential energy of the grid $a_0$ defined as:

$$\varepsilon_{a_0}(x_o, y_o) = k \cdot N_x - x_0, k > 1$$

where $x_o$ and $y_0$ are a horizontal coordinate value and a vertical coordinate value of the grid $a_0$ in the $BL_0$-level map respectively; k is a potential energy coefficient, and $N_x$ is a maximum horizontal coordinate value in the $BL_0$-level map; and the grid value is assigned to each of the plurality of grids in the $BL_0$-level map line-by-line.

In step S103, in case of being in a local optimum at the $BL_0$-level map, each map level is updated in ascending order, and the corresponding level is searched for the tp to acquire a tp list, a final tp is calculated according to a cost value, the final tp is transmitted to the USMV, and the USMV is switched to execute a tr instruction, and when the tr instruction is executed, the $BL_0$-level map in entered and path planning is performed; wherein the tr instruction represents the USMV is in a Travel state which is a non-task state after the USMV reaches the local optimum.

In step S104, when no target point tp is found in the $BL_L$-level map, the task is ended, the status of the highest level map is checked, and an end state is output.

In some alternative embodiments, the step S102 may comprise the following steps:

recording a detection area of the USMV in the updated environmental map as $D^0(\omega)$, $\omega \in D^0(\omega)$, wherein w is the position of the USMV, the $D^0(\omega)$ contains all the grids perceptible to the USMV at a current position;

defining a priority area $F^0$ wherein $F^0 \subseteq D^0(\omega)$, and the grids contained in the priority area $F^0$ satisfy the following two requirements: (1) a connection line between the grid and the w does not pass through a grid in a fz or obs state; and (2) a potential energy value of the grid is positive;

for coverage-path planning in the $BL_0$-level map, since a priority path of the USMV is to complete a coverage task in a direction of a single scanning line, selecting the grid on a same scanning line in the $D^0(\omega)$ as the target point; wherein specifically, the grid is selected according to the following steps: defining the grids in the $D^0(\omega)$ in both north and south directions as $\omega^N$ and $\omega^s$, when $BV_\omega > 0$ and $\{\omega^N, \omega^s\} \subset F^0$, in order to circumvent the case of massive backtracking, selecting the grid adjacent to the obstacle from the two grids, denoting the grid as $tp_{obs}$, in the case where both the $\omega^N$ and $\omega^s$ are adjacent to the obstacle, introducing both into a cost calculation formula to calculate the potential cost values J(tp) produced by both paths, and selecting a relatively optimum path from local and global points of view;

in the case where only one of the $\omega^N$ and $\omega^s$ is adjacent to the obstacle, then then giving priority to a $\omega^N$ or $\omega^s$ orientation where the adjacent obstacle is located to start traversal, wherein in the case of $BV_\omega > 0$, the status value of the $\omega$ grid where the USMV is located ue, in two grids above and below the $\omega$ grid, the status value of one is exp or obs and the status value of the other one is ue, the $\omega$ grid is the target point tp, and the USMV switches to execute a tc instruction which guides the USMV to start an actual bathymetry mission;

when $BV_\omega = 0$, $F^0 \neq \emptyset$, determining that the USMV has completed the task on the single scanning line, starting to turn to a next stage of traversal, taking the grid with a largest grid value as the target point tp, starting a next action; and when none of the above cases are met, determining that the USMV is in the local optimum, wherein the USMV is driving into a concave obstacle area or is surrounded by an area with $BV \leq 0$ when being in the local optimum, and switching to a high-level map for the path planning, and switching the USMV to execute the tr instruction.

The priority area is determined by:

$$F^0 = \{\alpha_0 \in D^0(\omega): BV_{\alpha_0} > 0\}.$$

The potential cost value is determined by:

$$J(tp) = k_\theta \cdot \theta(\omega, tp) + k_d \cdot d(\omega, tp) + k_{ul} \cdot N_{exp},$$

wherein, $$d(\omega, tp) = \|(\omega_x, \omega_y) - (tp_x, tp_y)\|_2,$$

$k_\theta$ represents a turn cost coefficient and is considered as a unit turn angle cost; $\theta$ represents an absolute value of an angular change; $k_d$ represents a distance cost coefficient, and is considered as a unit distance movement cost; d represents a Euclidean distance; $k_{ul}$ represents a global trend coefficient and is considered as the cost of changing the situation; $N_{exp}$ represents a number of ue-state grids in an input direction, $(\omega_x, \omega_y)$ represents horizontal and vertical coordinates of the $\omega$ grid, and $(tp_x, tp_y)$ represents horizontal and vertical coordinates of the target point tp.

In some alternative embodiments, the step S103 comprises:

switching to a $BL_l$-level map with l=1, finding a grid $\alpha_l$ with a largest $BV_{F^l(\omega)}$ in $F^l$, wherein, the detection area of the USMV at the $\omega$ grid in the $BL_l$-level map and having a detection range of $R_L$ is defined as $D^l(\omega)$, $\omega \in D^l(\omega)$; the priority area in the detection area $D^l(\omega)$ that is available for the USMV at the $\omega$ grid through an adjacent path and that is positive in the grid value is defined as $F^l$, $F^l \subseteq D^l(\omega)$ and $F^l = \{\alpha_l \in D^l(\omega): BV_{\alpha_l} > 0\}$;

keeping in a calculation state to calculate potential costs of all target points in the tp list comprising no less than 2 target points; selecting an optimum target point, and making the USMV start the bathymetry mission; and since the local optimum mainly occurs at the end of the obstacle or at an end of the scanning line, calculating an adjacent path with a greedy algorithm when executing the tr instruction for continuing to track an obstacle contour until moving directly to the target point, breaking away from the local optimum and reaching the target point; in a scanning task, performing a collision avoidance action by the USMV in a scenario with obstacle existing, and switching the USMV to execute the tr instruction, returning to the $BL_0$-level map after past and clear, resuming the bathymetry mission; if it is still impossible to break away from the local optimum when l=1, switching to a higher-level map level by level until the target point is derived; and if it is still unable to break away from the local optimum when l=L, then preliminarily determining that the traversal is completed.

In the $BL_l$-level map, the priority area is specifically expressed as:

$$F^l = \{\alpha_l \in D^l(\omega): BV_{\alpha_l} > 0\},$$

where $1 \leq l \leq L$.

The application also provides a computer-readable storage medium, such as a flash memory, a hard disk, a multimedia card, a card-type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a disk, an optical disk, a server, an App market, etc., a computer program is stored thereon which, when executed by a processor, implements the coverage-path planning method for the single unmanned surface mapping vessel in a method embodiment.

Additionally, in a first aspect, the present disclosure provides the coverage-path planning method for a single unmanned surface mapping vessel, which is executed with a system including at least one computer processor and a storage device in communication connection with the at least one processor, wherein the storage device stores instructions to be executed by the at least one processor and the instructions are executed in the at least one processor so that the at least one processor executes the coverage-path planning method for a single unmanned surface mapping vessel described above.

In a second aspect, the present disclosure provides a computer program product that includes a coverage-path planning process. The computer program product includes a computer program that is stored in a computer-readable storage medium. The computer program is executable by a computer to implement the above-described coverage-path planning method for a single unmanned surface mapping vessel.

In a third aspect, the present disclosure includes at least one signal transmitting module that is operable to a control signal, a path planning message or other necessary messages for communication with an external system or an operator in order to realize adjustment of a planned path, feedback for tasks, or other necessary communication; and an unmanned vessel signal receiving module and a data link, which are arranged for receiving signals and data transmitted from an external system, a transducer, or an operator for path adjustment, remote control, or data feedback, so that when a moth path of the unmanned vessel is confirmed, data can be transmitted to a motion controller of the unmanned vessel for subsequent operation.

In a fourth aspect, the present disclosure provides a motion controller of an unmanned vessel, which, based on a path message generated with a path-planning program that may include, at least partly, the computer program discussed above for implementing the above-described coverage-path planning method for a single unmanned surface mapping vessel, controls the course, the speed, and steering of the unmanned vessel, interprets data of the transducer, implements path planning, monitors progress of planning, and adjusts operation of the unmanned vessel, in order to ensure the unmanned vessel is following a predetermined path and executing a predetermined task; and an unmanned vessel power system in connection with the motion controller and including systems of driving, propelling, and energy for supplying power to the unmanned vessel to ensure the unmanned vessel is operable for moving along the planned path.

In a fifth aspect, the present disclosure enables visualization of a result of coverage-path planning by providing a visualizable interface for intuitively display a water body area, a location of an unmanned vessel, and a result of path planning, such that, on a map, each of a number of unmanned vessels is designated with a unique individual identification mark or symbol to assist operators or users to identify the vessels, wherein the identification mark or symbol includes or carries essential messages of the unmanned vessels, such as titles, speeds, and results of unmanned vessel coverage-path planning result.

The present disclosure, for at least the embodiments or aspects provided herein, is advantageous for at least the following. The present disclosure provides a coverage-path planning method for a single unmanned surface mapping vessel and a system or a set of devices for implementing or operating with the method, in which target points of a path are determined according to data of a water body area and distance, and among the target points, already-surveyed target points are recorded and un-surveyed target point are determined so that a cruise path having a shortest distance is generated dynamically during the cruise to ensure that even an unmanned vessel deviates from a predetermined path due to various factor, the unmanned vessel may still move along an optimum cruise path that is determined momentarily.

It should be noted that the various steps/components described in the present application may be split into more steps/components or two or more steps/components or partial operations of the steps/components may be combined into new steps/components to achieve the objectives of the present disclosure, depending on the requirements of the implementation.

It will be readily understood by those skilled in the art that the above description is only preferred embodiments of the present disclosure and is not intended to limit the present disclosure. Any modification, equivalent replacement, improvement, etc. made within the spirit and principles of the present disclosure should be included in the scope of protection of the present disclosure.

What is claimed is:

1. A coverage-path planning method for a single unmanned surface mapping vessel, which is executable in a system that comprises a computer processor and a storage device in communication connection with the computer processor and loaded with a computer program executed in the processor to implement the coverage-path planning method, the coverage-path planning method comprising the following steps:

(1) rasterizing an environmental map to create a plurality of grids, dividing the environmental map into a plurality of levels $(BL_0, BL_1, \ldots, BL_L)$ with several grids of a lower level forming one grid in a next higher level, initializing the environmental map by assigning a status value (GT) to each of the plurality of grids as ue, assigning a grid value $(BV_{a0})$ to a grid $a_0$ in a $BL_0$-level map, then importing the initialized environmental map, inputting coordinates and updating the environmental map, wherein the ue represents a free space where a bathymetry mission is not completed, L is a number of the levels of the environmental map, $BL_0$ is a lowest level and $BL_L$ is a highest level;

(2) outputting, by an Unmanned Surface Mapping Vessel (USMV), position information ω and obstacle information η thereof according to the updated environmental map to further update the environmental map, outputting a grid status list (GT_list) of the plurality of grids according to the further updated environmental map, and receiving the grid value of each of the plurality of grids in the $BL_0$-level map and the position information ω and obstacle information η output from the USMV according to the grid status list, starting path planning, and outputting a target point tp to the USMV, wherein the tp represents an index value of the grid where a next target point of the USMV is located;

(3) performing an operation of updating each map level in an ascending order in case of being in a local optimum at the $BL_0$-level map, searching the corresponding level for the tp to acquire a tp list, calculating a final tp according to a cost value, transmitting the final tp to the USMV, switching the USMV to execute a tr instruction, and when the tr instruction is executed, entering the $BL_0$-level map and continuing to perform the path planning, wherein the tr instruction represents that the USMV is in a Travel state which is a non-task state after the USMV reaches the local optimum; and (4) ending the operation of updating in case of finding no target point tp in the $BL_L$-level map, checking a status of the highest level map, and outputting an end state.

2. The coverage-path planning method according to claim 1, wherein the status value $(GT_{\alpha_0})$ of the grid $a_0$ in the $BL_0$-level map is defined as:

$$GT_{a_0} = obs,\ \exp,\ ue\ or\ fz$$

wherein obs represents an obstacle, exp represents the free space where the bathymetry mission has been completed, and fz represents a forbidden zone;

the grid value $(BV_{a0})$ of the grid $a_0$ in the $BL_0$-level map is defined as:

$$BV_{a_0} = \begin{cases} -1, \text{if } GT_{a_0} = obs \text{ or } fz \\ 0, \text{if } GT_{a_0} = \exp \\ \varepsilon_{a_0}, \text{if } GT_{a_0} = ue \end{cases}$$

wherein $\varepsilon_{\alpha_0}$ is a potential energy of the grid $a_0$ defined as:

$$\varepsilon_{a_0}(x_o, y_o) = k \cdot N_x - x_0,\ k > 1$$

wherein $x_o$ and $y_o$ are a horizontal coordinate value and a vertical coordinate value of the grid $a_0$ in the $BL_0$-level map respectively; k is a potential energy coefficient, and $N_x$ is a maximum horizontal coordinate value in the $BL_0$-level map; and the grid value is assigned to each of the plurality of grids in the $BL_0$-level map line-by-line.

3. The coverage-path planning method according to claim 1, wherein the step (2) comprises:

recording a detection area of the USMV in the updated environmental map as $D^0(\omega)$, $\omega \in D^0(\omega)$, wherein the $D^0(\omega)$ contains all the grids perceptible to the USMV at a current position;

defining a priority area $F^0$, wherein $F^0$ comprises a set of grids with a connection line between each of the set of grids and the $\omega$ does not pass through a grid in a fz or obs state and a potential energy value of each of the set of grids being positive, $F^0 \subseteq D^0(\omega)$;

for coverage-path planning in the $BL_0$-level map, since a priority path of the USMV is to complete a coverage task in a direction of a single scanning line, selecting the grid on a same scanning line in the $D^0(\omega)$ as the target point; wherein the grid is selected according to the following steps: defining the grids in the $D^0(\omega)$ in both north and south directions as $\omega^N$ and $\omega^s$, when $BV_\omega > 0$ and $\{\omega^N, \omega^S\} \subset F^0$, in order to circumvent the case of massive backtracking, selecting the grid adjacent to the obstacle from the two grids, denoting the grid as $tp_{obs}$;

in the case where both the $\omega^N$ and $\omega^s$ are adjacent to the obstacle, introducing both into a cost calculation formula to calculate the potential cost values J(tp) produced by both paths, and selecting a relatively optimum path from local and global points of view;

in the case where only one of the $\omega^N$ and $\omega^s$ is adjacent to the obstacle, then then giving priority to a $\omega^N$ or $\omega^s$ orientation where the adjacent obstacle is located to start traversal, wherein in the case of $BV_\omega > 0$, the status value of the $\omega$ grid where the USMV is located ue, in two grids above and below the $\omega$ grid, the status value of one is exp or obs and the status value of the other one is ue, the $\omega$ grid is the target point tp, and the USMV switches to execute a tc instruction which guides the USMV to start an actual bathymetry mission;

when $BV_\omega = 0$, $F^0 \neq \varnothing$, determining that the USMV has completed the task on the single scanning line, starting to turn to a next stage of traversal, taking the grid with a largest grid value as the target point tp, starting a next action; and when none of the above cases are met, determining that the USMV is in the local optimum, wherein the USMV is driving into a concave obstacle area or is surrounded by an area with $BV \leq 0$ when being in the local optimum, and switching to a high-level map for the path planning, and switching the USMV to execute the tr instruction.

4. The coverage-path planning method according to claim 3, wherein the priority area is determined by:

$$F^0 = \left\{\alpha_0 \in D^0(\omega): BV_{a_0} > 0\right\}.$$

5. The coverage-path planning method according to claim 4, wherein the potential cost value is determined by:

$$J(tp) = k_\theta \cdot \theta(\omega, tp) + k_d \cdot d(\omega, tp) + k_{ui} \cdot N_{exp},$$

wherein, $$d(\omega, tp) = \left\| (\omega_x, \omega_y) - (tp_x, tp_y) \right\|_2,$$

$k_\theta$ represents a turn cost coefficient and is considered as a unit turn angle cost; $\theta$ represents an absolute value of an angular change; $k_d$ represents a distance cost coefficient, and is considered as a unit distance movement cost; d represents a Euclidean distance; $k_{ui}$ represents a global trend coefficient and is considered as the cost of changing the situation; $N_{exp}$ represents a number of ue-state grids in an input direction, $(\omega_x, \omega_y)$ represents horizontal and vertical coordinates of the $\omega$ grid, and $(tp_x, tp_y)$ represents horizontal and vertical coordinates of the target point tp.

6. The coverage-path planning method according to claim 5, wherein the step (3) comprises:

switching to a $BL_1$-level map with l=1, finding a grid $\alpha_1$ with a largest $BV_{F^l(\omega)}$ in $F^l$, wherein, the detection area of the USMV at the $\omega$ grid in the $BL_l$-level map and having a detection range of $R_L$ is defined as $D^l(\omega)$, $\omega \in D^l(\omega)$; the priority area in the detection area $Dl(\omega)$ that is available for the USMV at the $\omega$ grid through an adjacent path and that is positive in the grid value is defined as $F^l$, $F^l \subseteq D^l(\omega)$ and $F^l = \{\alpha_i \in D^l (\omega): BV_{\alpha_i} > 0\}$;

keeping in a calculation state to calculate potential costs of all target points in the tp list comprising no less than 2 target points; selecting an optimum target point, and making the USMV start the bathymetry mission; and since the local optimum mainly occurs at the end of the obstacle or at an end of the scanning line, calculating an adjacent path with a greedy algorithm when executing the tr instruction for continuing to track an obstacle contour until moving directly to the target point, breaking away from the local optimum and reaching the target point; in a scanning task, performing a collision avoidance action by the USMV in a scenario with obstacle existing, and switching the USMV to execute the tr instruction, returning to the $BL_0$-level map after past and clear, resuming the bathymetry mission; if it is still impossible to break away from the local optimum when l=1, switching to a higher-level map level by level until the target point is derived; and if it is still unable to break away from the local optimum when l=L, then preliminarily determining that the traversal is completed.

7. The coverage-path planning method according to claim 6, wherein, in the $BL_l$-level map, the priority area is specifically expressed as:

$$F^l = \left\{ \alpha_l \in D^l(\omega):\ BV_{\alpha_l} > 0 \right\},$$

wherein $1 \leq l \leq L$.

8. The non-transitory tangible computer-readable storage device storing the computer program which, when executed by the computer processor, causes the system to implement the coverage-path planning method according to claim 1.

\* \* \* \* \*